(12) United States Patent
Yoneyama

(10) Patent No.: US 10,070,039 B2
(45) Date of Patent: Sep. 4, 2018

(54) IMAGE PROCESSING DEVICE AND IMAGE PROCESSING METHOD

(71) Applicant: Olympus Corporation, Shibuya-ku, Tokyo (JP)

(72) Inventor: Hisashi Yoneyama, Hino (JP)

(73) Assignee: Olympus Corporation, Tokyo (JP)

( * ) Notice: Subject to any disclaimer, the term of this patent is extended or adjusted under 35 U.S.C. 154(b) by 48 days.

(21) Appl. No.: 14/197,537

(22) Filed: Mar. 5, 2014

(65) Prior Publication Data
US 2014/0253736 A1 Sep. 11, 2014

(30) Foreign Application Priority Data

Mar. 5, 2013 (JP) ................. 2013-042779

(51) Int. Cl.
*H04N 5/232* (2006.01)

(52) U.S. Cl.
CPC .............................. *H04N 5/23212* (2013.01)

(58) Field of Classification Search
CPC ................................................. H04N 5/23212
USPC ........................................................ 348/169
See application file for complete search history.

(56) References Cited

U.S. PATENT DOCUMENTS

| | | | | |
|---|---|---|---|---|
| 2007/0195189 A1* | 8/2007 | Kimoto | .................. | G03B 13/34 348/345 |
| 2009/0135291 A1* | 5/2009 | Sugimoto | .......... | H04N 5/23212 348/347 |
| 2011/0164863 A1* | 7/2011 | Hayashi | ............... | G02B 27/646 396/55 |
| 2012/0057048 A1* | 3/2012 | Kindaichi | .......... | H04N 5/23212 348/231.99 |

FOREIGN PATENT DOCUMENTS

| | | |
|---|---|---|
| JP | 2605004 | 4/1997 |
| JP | 2012-058439 | 3/2012 |
| JP | 2013-012940 | 1/2013 |

OTHER PUBLICATIONS

Third Office Action to corresponding Chinese Patent Application No. 201410078625.X, dated Oct. 26, 2017 (8 pgs.), with translation (18 pgs.).
Second Office Action to corresponding Chinese Patent Application No. 201410078625.X, dated May 3, 2017 (9 pgs.), with translation (19 pgs.).

\* cited by examiner

*Primary Examiner* — Gims Philippe
*Assistant Examiner* — Mainul Hasan
(74) *Attorney, Agent, or Firm* — John C. Pokotylo; Pokotylo Patent Services

(57) ABSTRACT

An image processing device includes a focus adjusting section, a controller, and a track processing section. The focus adjusting section executes imaging operations plural times while moving a focus lens, performs a scanning operation, and moves the focus lens to a focusing position calculated based on the position where the contrast reaches the peak. The controller allows the imaging element to execute a continuous photographing operation of continuously performing the imaging operation for photographing. The track processing section tracks a subject based on the image data in which the contrast reaches the peak.

24 Claims, 12 Drawing Sheets

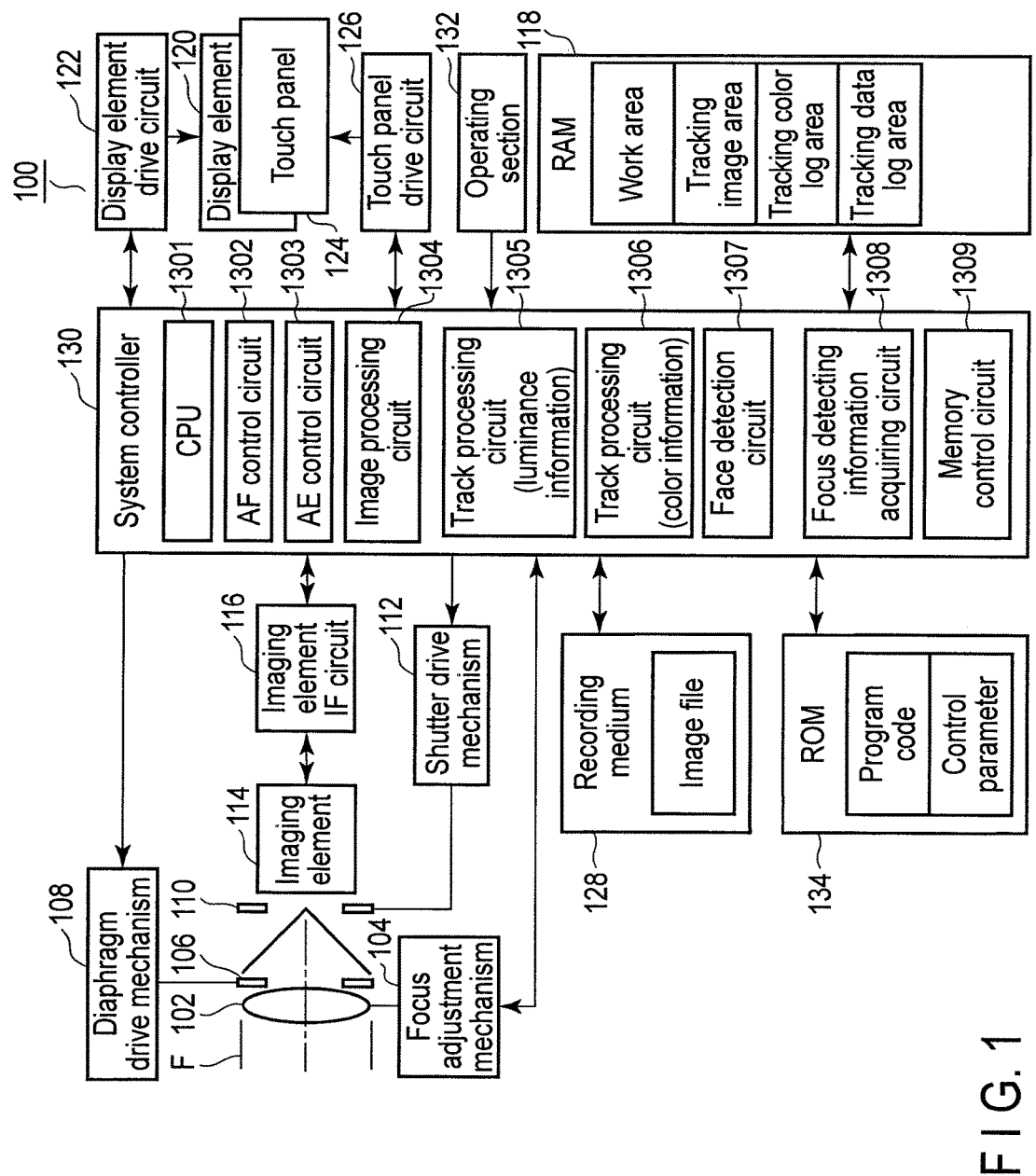
F I G. 1

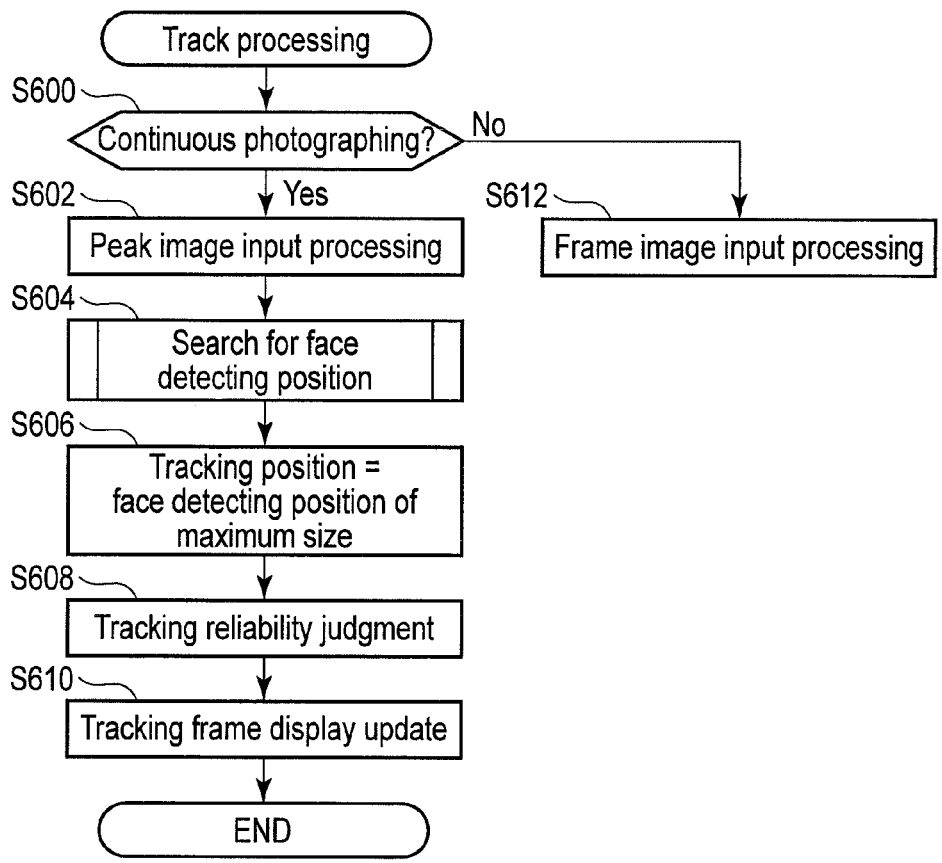
F I G. 10
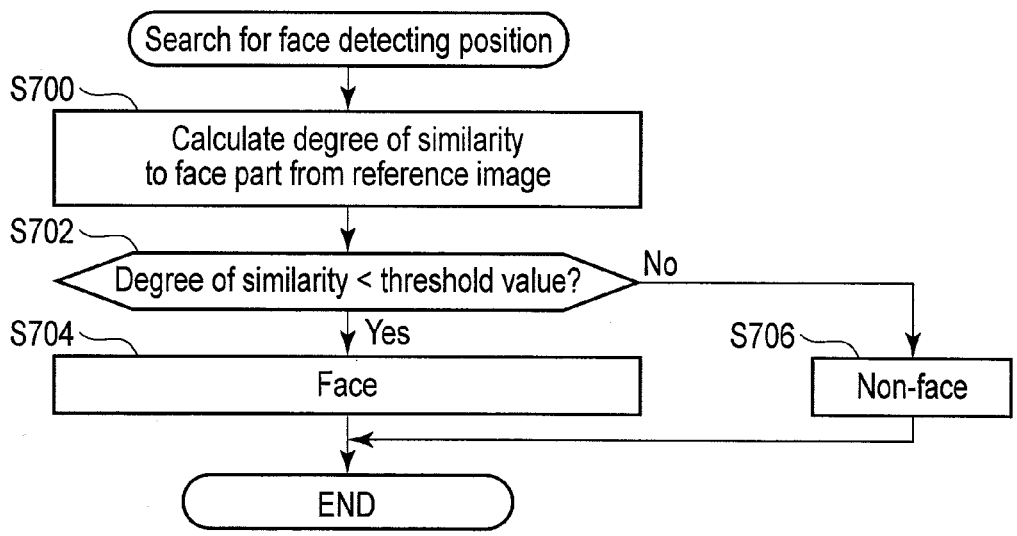
F I G. 11

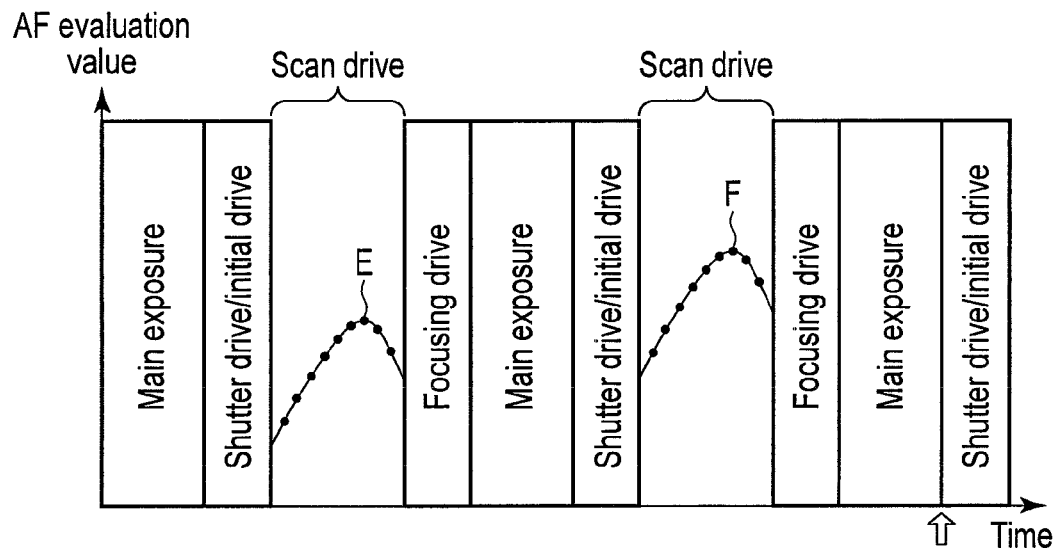
FIG. 14
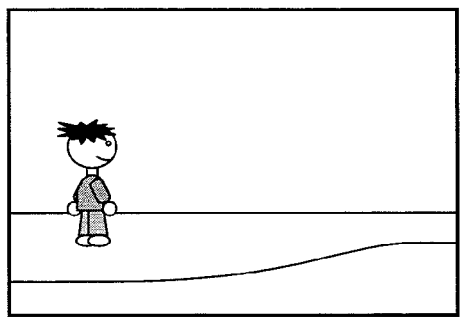 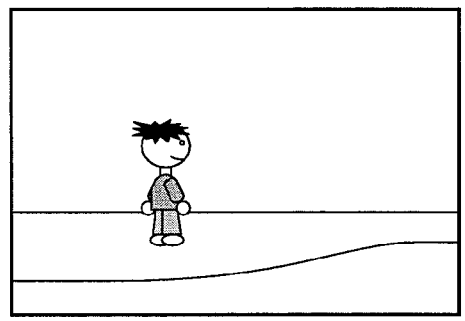
FIG. 15A     FIG. 15B

IMAGE PROCESSING DEVICE AND IMAGE PROCESSING METHOD

CROSS-REFERENCE TO RELATED APPLICATIONS

This application is based upon and claims the benefit of priority from the prior Japanese Patent Application No. 2013-042779, filed Mar. 5, 2013, the entire contents of which are incorporated herein by reference.

BACKGROUND OF THE INVENTION

1. Field of the Invention

The present invention relates to an image processing device and image processing method which perform track processing to track a subject.

2. Description of the Related Art

Heretofore, there has been known a technology of executing automatic focusing control (AF) and automatic exposure control (AE) to follow a specific subject, when a moving object is photographed or a moving image is photographed. Track processing has been used to follow such a specific subject (e.g., refer to Japanese Patent No. 2605004).

BRIEF SUMMARY OF THE INVENTION

According to a first aspect of the invention, there is provided an image processing device comprising: a focus adjusting section which executes imaging operations plural times by an imaging element while moving a focus lens included in a photographing optical system, performs a scanning operation to detect a position of the focus lens in which there is acquired image data, where a contrast reaches a peak, among pieces of image data acquired by the imaging element as results of the imaging operations of the plural times, and moves the focus lens to a focusing position calculated based on the position where the contrast reaches the peak; a controller which allows the imaging element to execute a continuous photographing operation of continuously performing the imaging operation for photographing; and a track processing section which tracks a subject based on the image data acquired by the imaging element, wherein the track processing section allows the focus adjusting section to execute the scanning operation during the execution of the continuous photographing operation to distinguish the image data in which the contrast reaches the peak, and tracks the subject based on the image data in which the contrast reaches the peak.

According to a second aspect of the invention, there is provided an image processing device comprising: a focus adjusting section which executes imaging operations of plural times by an imaging element while moving a focus lens included in a photographing optical system, performs a scanning operation to detect a position of the focus lens in which there is acquired image data, where a contrast reaches a peak, among pieces of image data acquired by the imaging element as results of the imaging operations of the plural times, and moves the focus lens to a focusing position calculated based on the position where the contrast reaches the peak; a controller which allows the imaging element to execute a continuous photographing operation of continuously performing the imaging operation for photographing; and a track processing section which tracks a subject based on the image data acquired by the imaging element, wherein the track processing section allows the focus adjusting section to execute the scanning operation during the execution of the continuous photographing operation, and tracks the subject based on the image data, where the contrast has a predetermined value or more, of the image data acquired during the scanning operation.

According to a third aspect of the invention, there is provided an image processing method comprising: causing an imaging element to execute a continuous photographing operation of continuously performing an imaging operation for photographing; executing imaging operations plural times by an imaging element while moving a focus lens included in a photographing optical system during the continuous photographing operation; and tracking a subject based on image data where a contrast reaches a peak, among pieces of image data acquired by the imaging element as results of the imaging operations of the plural times.

According to a fourth aspect of the invention, there is provided an image processing method comprising: causing an imaging element to execute a continuous photographing operation of continuously performing an imaging operation for photographing; executing imaging operations plural times by an imaging element while moving a focus lens included in a photographing optical system during the continuous photographing operation; and tracking a subject based on the image data, where the contrast has a predetermined value or more, of the image data acquired by the imaging element as results of the imaging operations of the plural times.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing a constitution of an example of an imaging device including an image processing device according to an embodiment of the present invention;

FIG. 10 is a flowchart showing the track processing in which face detection is used;

FIG. 11 is a flowchart showing the search processing of a face detecting position;

FIG. 14 is a diagram showing acquisition timings of image data for use in the track processing of the embodiment of the present invention;

FIG. 15A and FIG. 15B are views showing examples of peak image data;

DETAILED DESCRIPTION OF THE INVENTION

Figure 2A:
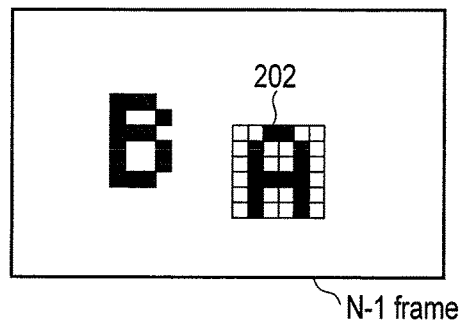
FIG. 2A and FIG. 2B are explanatory views of track processing in which luminance information is used.

Hereinafter, embodiments of the present invention will be described with reference to the drawings.

FIG. 1 is a view showing a constitution of an example of an imaging device including an image processing device according to an embodiment of the present invention. An imaging device 100 shown in FIG. 1 includes a photographing optical system 102, a focus adjustment mechanism 104, a diaphragm 106, a diaphragm drive mechanism 108, a shutter 110, a shutter drive mechanism 112, an imaging element 114, an imaging element interface (IF) circuit 116, a RAM 118, a display element 120, a display element drive circuit 122, a touch panel 124, a touch panel drive circuit 126, a recording medium 128, a system controller 130, an operating section 132, and a ROM 134.

The photographing optical system 102 is an optical system to guide a photographing luminous flux F from an unshown subject onto a light receiving surface of the imaging element 114. The photographing optical system 102 has lenses such as focus lenses or the like. The focus adjustment mechanism 104 has a motor, a drive circuit thereof, and the like. The focus adjustment mechanism 104 drives the focus lens in the photographing optical system 102 in its optical axis direction (a dashed line direction shown in the drawing) in accordance with control of a CPU 1301 in the system controller 130.

The diaphragm 106 is configured to be openable and closable, and regulates an amount of the photographing luminous flux F entering the imaging element 114 via the photographing optical system 102. The diaphragm drive mechanism 108 has a drive mechanism to drive the diaphragm 106. The diaphragm drive mechanism 108 drives the diaphragm 106 in accordance with the control of the CPU 1301 in the system controller 130.

The shutter 110 is configured to set the light receiving surface of the imaging element 114 to a light intercepting state or an exposure state. An exposure time of the imaging element 114 is regulated by the shutter 110. The shutter drive mechanism 112 has a drive mechanism to drive the shutter 110, and drives the shutter 110 in accordance with the control of the CPU 1301 in the system controller 130.

The imaging element 114 has the light receiving surface on which there is formed an image of the photographing luminous flux F from the subject condensed via the photographing optical system 102. The light receiving surface of the imaging element 114 has a constitution in which pixels are disposed in a two-dimensional manner. Furthermore, on a light entering side of the light receiving surface, a color filter is provided. The imaging element 114 having such a constitution converts the image (a subject image) corresponding to the photographing luminous flux F for the image formation on the light receiving surface into an electric signal (hereinafter referred to as an image signal) in accordance with an amount of light of the image.

The imaging element IF circuit 116 which functions as an imaging section together with the photographing optical system 102 and the imaging element 114 drives the imaging element 114 in accordance with the control of the CPU 1301 in the system controller 130. Furthermore, the imaging element IF circuit 116, in accordance with the control of the CPU 1301 in the system controller 130, reads the image signal obtained by the imaging element 114, and subjects the read image signal to analog processing such as correspondence double sampling (CDS) processing or automatic gain control (AGC) processing. Furthermore, the imaging element IF circuit 116 converts, into a digital signal (hereinafter referred to as image data), the image signal subjected to the analog processing.

The RAM 118 is, for example, an SDRAM, and has a work area, a tracking image area, a tracking color log area and a tracking data log area as storage areas.

The work area is the storage area provided in the RAM 118 to temporarily store data generated in each section of the imaging device 100, for example, the image data obtained by the imaging element IF circuit 116.

The tracking image area is the storage area provided in the RAM 118 to temporarily store the image data required for track processing. As the image data required for the track processing, there are evaluation image data and reference image data.

The tracking color log area is the storage area provided in the RAM 118 to temporarily store a tracking color log. The tracking color log is a log where color information of a tracking position obtained as a result of the track processing is recorded.

The tracking data log area is the storage area provided in the RAM 118 to temporarily record a tracking data log. The tracking data log is a log where position data of the tracking position obtained as a result of the track processing is recorded.

The display element 120 is, for example, a liquid crystal display (LCD) to display various images such as an image for live viewing and an image recorded in the recording medium 128. The display element drive circuit 122 drives the display element 120 on the basis of the image data input from the CPU 1301 of the system controller 130 to display the image in the display element 120.

The touch panel 124 is formed integrally on a display screen of the display element 120 to detect a contact position of a user's finger or the like on the display screen, and the like. The touch panel drive circuit 126 drives the touch panel 124, and also outputs a contact detection signal from the touch panel 124 to the CPU 1301 of the system controller 130. The CPU 1301 detects, from the contact detection signal, a contact operation of the user on the display screen, and then executes processing in response to the contact operation.

The recording medium 128 is, for example, a memory card to record an image file obtained by a photographing operation. The image file is a file in which a predetermined header is applied to the image data. In the header, data indicating photographing conditions, data indicating the tracking position, and the like are recorded as tag data.

The system controller 130 has, as control circuits to control the operation of the imaging device 100, the CPU 1301, an AF control circuit 1302, an AE control circuit 1303, an image processing circuit 1304, track processing circuits 1305 and 1306, a face detection circuit 1307, a focus detecting information acquiring circuit 1308, and a memory control circuit 1309.

The CPU 1301 is a controller to control operations of respective blocks of the focus adjustment mechanism 104, the diaphragm drive mechanism 108, the shutter drive mechanism 112, the display element drive circuit 122, the touch panel drive circuit 126 and the like outside the system controller 130, and operations of the respective control circuits inside the system controller 130.

The AF control circuit 1302 which functions as an example of a focus adjusting section controls contrast AF processing. Specifically, the AF control circuit 1302 evaluates a contrast of the image data in accordance with an AF evaluation value acquired by the focus detecting information acquiring circuit 1308, controlling the focus adjustment mechanism 104 to set the focus lens to a focused state.

The AE control circuit 1303 controls AE processing. Specifically, the AE control circuit 1303 calculates a subject luminance by use of the image data obtained by the imaging element IF circuit 116. In accordance with this subject luminance, the CPU 1301 calculates an opening amount of the diaphragm 106 during exposure (a diaphragm value), an open time of the shutter 110 (a shutter speed value), an imaging element sensitivity, an ISO sensitivity, and the like.

The image processing circuit 1304 performs various types of image processing to the image data. Examples of this image processing include color correction processing, gamma (γ) correction processing, and compression processing. Furthermore, the image processing circuit 1304 also subjects the compressed image data to extension processing.

The track processing circuit 1305 performs track processing in which luminance information of the image data is used. Here, the track processing in which the luminance information is used will briefly be described. In the track processing in which the luminance information is used, for example, when a tracking object is set in an (N−1) frame shown in FIG. 2A, the image data of a predetermined region 202 including the tracking object in this (N−1) frame is stored as the evaluation image data in the tracking image area of the RAM 118. In the track processing after this, a portion corresponding to the evaluation image data 202 in the reference image data is searched.

Figure 2B:
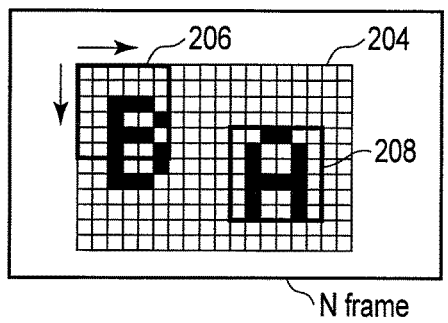

The track processing of an N frame is illustrated as an example. First, the image data of the N frame is stored as the reference image data in the tracking image area of the RAM 118. A degree of image correlation between the image data of a predetermined tracking area 204 of the reference image data and the evaluation image data 202 is obtained to search for a portion of the reference image data which corresponds to the evaluation image data 202. The image correlation degree is calculated, for example, from a sum of absolute differences between the evaluation image data and the reference image data (the sum obtained by accumulating the absolute values of luminance differences each obtained for each pixel). For example, when a sum of absolute differences between reference image data of an area 206 of the reference image data shown in FIG. 2B and the evaluation image data 202 is obtained, the reference image data of the area 206 is the image data obviously different from the evaluation image data 202, and the sum of the absolute differences is large. On the contrary, when a sum of absolute differences between reference image data of an area 208 and the evaluation image data 202 is obtained, the sum of the absolute differences is small. As described above, as the degree of image correlation with the evaluation image data 202 is larger, the sum of the absolute differences is smaller. In the track processing in which the luminance information is used, an area where the degree of image correlation is a maximum, i.e., the sum of the absolute differences is a minimum is searched from the reference image data. In the example of FIG. 2B, an area 208 is searched. It is to be noted that in the tracking data log area, the position where a degree of coincidence is highest in the area 208 is recorded as a tracking position. When there are such positions, for example, a position close to the center of the area 208 is the tracking position. During the next track processing, this tracking position is preferably a start position of the track processing. In consequence, it is possible to reduce a time required for the track processing.

Figure 3A:
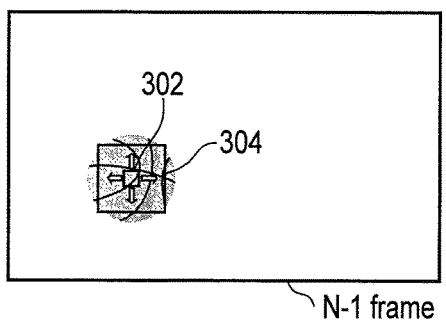
FIG. 3A and FIG. 3B are explanatory views of track processing in which color information is used.

The track processing circuit 1306 performs track processing in which the color information of the image data is used. Here, the track processing in which the color information is used will briefly be described. In the track processing in which the color information is used, there is searched a similar color area as an area which can be determined to have the same color as a color set in the evaluation image data. As shown in FIG. 3A, when a position 302 where the subject is present is specified in the (N−1) frame, image data including the position 302 is the evaluation image data, and the color information of the position 302 of this evaluation image data is acquired. Then, in the reference image data, the position 302 having the color information most similar to the color information acquired from the evaluation image data is used as the start position of the track processing, to search for an area having the same color information as in the position 302. Specifically, the color information is successively acquired from the position 302 as the start position toward its periphery. When it can be determined that the acquired color information is the same as the color information of the position 302, the color information is included in the area, and when it cannot be determined that the acquired color information is the same as the color information of the position 302, the color information is not included in the area. When the similar color area is searched in this manner, for example, in the case of such a monochromatic subject as shown in FIG. 3A, a rectangular area 304 inscribed in the subject is the similar color area. Furthermore, the tracking position to be recorded in the tracking data log area is, for example, a center of gravity position of the similar color area 304 (the same as the position 302 in the example of FIG. 3A). In the next track processing, this tracking position is the start position of the track processing.

Figure 3B:
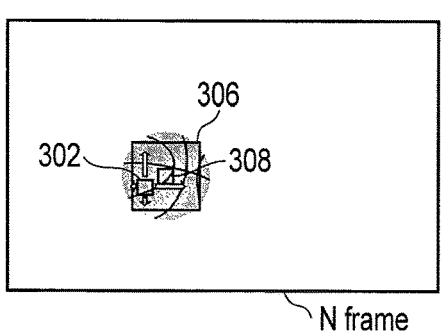

The track processing of the N frame is illustrated as an example. In the predetermined tracking area of the image data of the N frame stored as the reference image data shown in FIG. 3B, the tracking position 302 of the (N−1) frame is the start position of the track processing, and an area which can be determined to have the same color as the color of the similar color area 304 is searched as the similar color area successively from the periphery of the tracking position 302. In the example of FIG. 3B, an area 306 is the similar color area. Furthermore, a center of gravity position 308 of the area 306 as the obtained similar color area is stored as the tracking position in the tracking data log area.

Figure 4A:
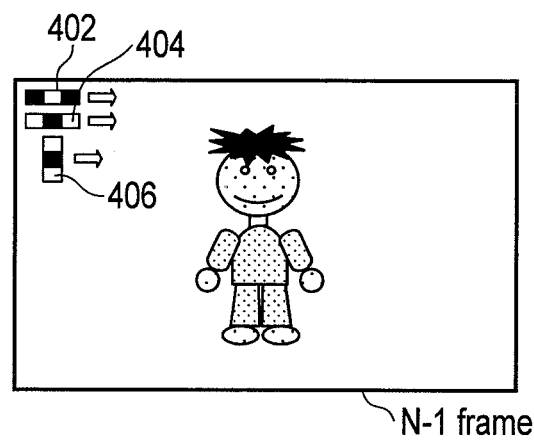
FIG. 4A and FIG. 4B are explanatory views of track processing in which face detection processing is used.
Figure 4B:
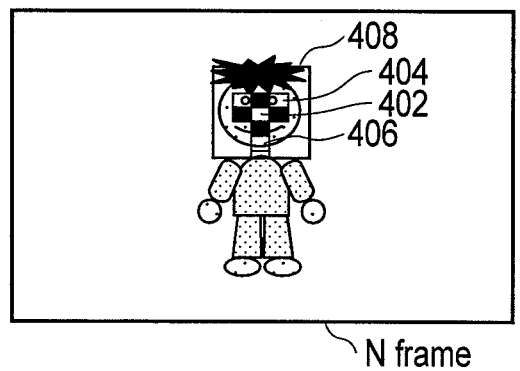

The face detection circuit 1307 detects a face of a subject (a person) in the image data. Here, track processing in which face detection processing is used will briefly be described. In the face detection processing, there is obtained a degree of image correlation between the image data obtained in each frame and each of face parts 402, 404 and 406 shown in FIG. 4A. The face part 402 is the image data corresponding to a shading pattern around a nose portion of the person, the face part 404 is the image data corresponding to a shading pattern around eye portions of the person, and the face part 406 is the image data corresponding to a shading pattern around a mouth portion of the person. The degree of image correlation between the image data and each of the face parts 402, 404 and 406 is a maximum when the parts have a predetermined arrangement showing the face of the person as shown in FIG. 4B. At this time, the face is present in an area 408 including the face parts 402, 404 and 406. A size of each of the face parts 402, 404 and 406 may be changed in accordance with a preset size of the face to be searched. In FIG. 4B, the face area is the rectangular area, but may be a round area.

The focus detecting information acquiring circuit 1308 extracts high frequency components of the image data input via the imaging element 114 and accumulates the extracted high frequency components to acquire the AF evaluation value.

The memory control circuit 1309 is an interface which executes control so that the CPU 1301 or the like accesses the RAM 118, the recording medium 128 and the ROM 134.

The operating section 132 has various operation members to be operated by the user. Examples of the operating section 132 include a release button, a mode button, a selection key, and a power button.

The release button has a first release switch and a second release switch. The first release switch is a switch which turns on when the user half presses the release button. When the first release switch is turned on, a photographing preparing operation such as AF processing is performed. Furthermore, the second release switch is a switch which turns on when the user fully presses the release button. When the second release switch is turned on, an exposure operation for still image photographing is performed.

The mode button is an operation member to select a photographing setting of the imaging device. In the present embodiment, as the photographing setting of the imaging device, for example, a usual photographing mode and a continuous photographing mode can be selected. The usual photographing mode is the photographing setting to perform the still image photographing of one time in response to the full pressing of one time of the release button. Furthermore, the continuous photographing mode is the photographing setting to perform the still image photographing of plural times in response to the full pressing of the release button once.

The selection key is, for example, an operation member to select or determine a term on a menu screen. When the selection key is operated by the user, the selection or the determination of the term on the menu screen is performed.

The power button is the operation member to turn on or off a power source of the imaging device. When the power button is operated by the user, the imaging device 100 enters an operable state. When the power button is operated during the start of the imaging device, the imaging device 100 is in a power saving stand-by state.

The ROM 134 stores program codes for the CPU 1301 to execute various types of processing. Furthermore, the ROM 134 stores various control parameters such as control parameters required for the operations of the photographing optical system 102, the diaphragm 106 and the imaging element 114 and a control parameter required for the image processing in the image processing circuit 1304. Furthermore, the ROM 134 also stores data of the face parts for use in the face detection in the face detection circuit 1307, data for displaying a tracking frame, and the like.

Figure 5:
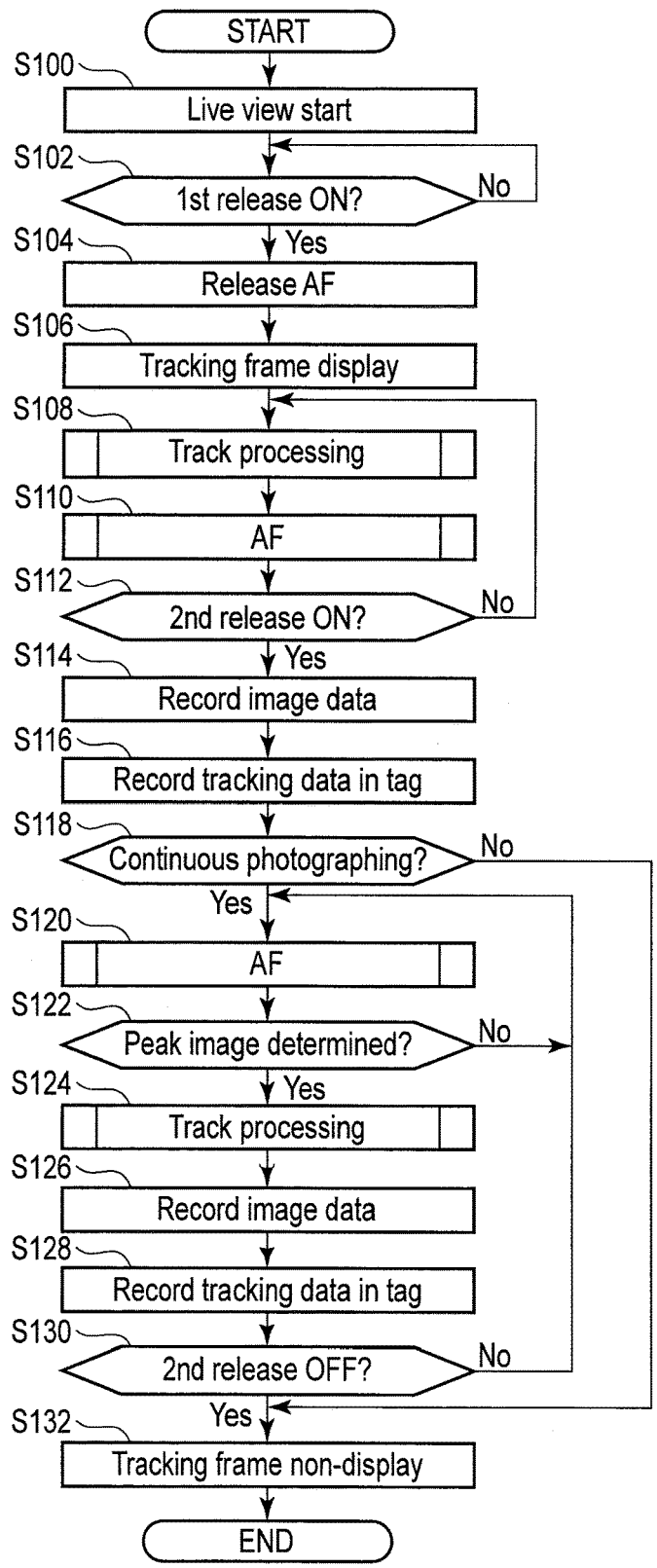
FIG. 5 is a flowchart showing a photographing operation of the imaging device.

Next, an operation of the imaging device according to the present embodiment will be described. FIG. 5 is a flowchart showing the photographing operation of the imaging device 100. The CPU 1301 reads the necessary program code from the ROM 134 to control the operation of FIG. 5.

In S100, the CPU 1301 starts a live view operation. As the live view operation, the CPU 1301 controls the shutter drive mechanism 112 to open the shutter 110, and then the CPU 1301 controls the imaging element IF circuit 116 to start the imaging by the imaging element 114. Afterward, the CPU 1301 inputs the image data stored in the work area of the RAM 118 as a result of the imaging by the imaging element 114 into the image processing circuit 1304 to subject the image data to the image processing for live view display. Subsequently, the CPU 1301 inputs the image data subjected to the image processing for live view display into the display element drive circuit 122 to display an image in the display element 120. Such a display operation is repeatedly executed, thereby displaying a moving image of the subject. By this moving image display, the user can observe the subject.

In S102, the CPU 1301 determines whether the first release switch is turned on. In S102, the CPU 1301 continues the live view operation until it is determined that the first release switch is turned on.

Furthermore, when it is determined in S102 that the first release switch is turned on, the CPU 1301 in S104 allows the AF control circuit 1302 to execute release AF processing. In the release AF, the focus lens is driven to a focusing position by a scanning operation. In the scanning operation, the AF control circuit 1302 controls the focus adjustment mechanism 104, and evaluates the AF evaluation values successively calculated by the focus detecting information acquiring circuit 1308, while driving the focus lens in one direction in a predetermined scanning range. Then, the AF control circuit 1302 stops the drive of the focus lens at a lens position where a contrast is a maximum, as a result of the evaluation of the AF evaluation value.

In S106, the CPU 1301 controls the display element drive circuit 122 to display the tracking frame in the display element 120. Here, the tracking frame is displayed at a position of the tracking object on the screen of the display element 120. For example, the subject focused by the release AF may be the tracking object and the tracking frame may be displayed on the subject. Furthermore, when the face is detected by the face detection circuit 1307, the tracking frame may be displayed on the face. Furthermore, when the subject displayed on the screen of the display element 120 is specified by the touch panel 124, the tracking frame may be displayed on the subject.

In S108, the CPU 1301 performs the track processing. It is preset whether there is to be performed the track processing in which the luminance information is used, the track processing in which the color information is used, or the track processing in which the face detection is used. Plural types of track processing may be used together. Details of each track processing will be described later.

In S110, the CPU 1301 allows the AF control circuit 1302 to execute the AF processing so that the subject of the tracking position is focused. Details of the AF processing will be described later.

In S112, the CPU 1301 determines whether the second release switch is turned on. When it is determined in S112 that the second release switch is not turned on, the CPU 1301 executes the track processing of S108 and the subsequent processing. In an example of FIG. 5, the track processing is continued until the second release switch is turned on.

Furthermore, when it is determined in S112 that the second release switch is turned on, the CPU 1301 performs processing to record still image data in the recording medium 128 in S114. In this case, as AE processing, the CPU 1301 calculates the opening amount of the diaphragm 106 during main exposure (the diaphragm value), and the open time of the shutter 110 (the shutter speed value), which are required so that a luminance of the subject of the tracking position calculated by the AE control circuit 1303 is set to a predetermined suitable amount (a suitable exposure amount). Then, the CPU 1301 controls the shutter drive mechanism 112 to close the shutter 110. Afterward, the CPU 1301 controls the diaphragm drive mechanism 108 to narrow the diaphragm 106 down to the previously calculated diaphragm value. Subsequently, the CPU 1301 controls the shutter drive mechanism 112 to perform the imaging (the exposure) by the imaging element 114, while opening the shutter 110 only for the previously calculated open time. Afterward, the CPU 1301 processes the still image data obtained via the imaging element 114 in the image processing circuit 1304. Then, the CPU 1301 gives a header to the still image data processed in the image processing circuit 1304 to generate a still image file, and records the generated still image file in the recording medium 128.

In S116, the CPU 1301 additionally records data indicating the tracking position obtained as a result of the track processing of S108 in the still image file previously recorded in the recording medium 128.

In S118, the CPU 1301 determines whether or not the photographing setting is the continuous photographing mode. As described above, the photographing setting is set, for example, by the operation of the mode button.

When it is determined in S118 that the photographing setting is the continuous photographing mode, the CPU 1301 in S120 allows the AF control circuit 1302 to execute the AF processing again. Details of this AF processing will be described later.

In S122, the CPU 1301 determines whether or not peak image data can be determined as a result of the AF processing of S120. The peak image data is the image data in which the AF evaluation value calculated during the AF processing is a maximum (peak). Details thereof will be described later. When it is determined in S122 that the peak image data cannot be determined, the CPU 1301 instructs the re-execution of the AF processing of S120 to the AF control circuit 1302.

When it is determined in S122 that the peak image data can be determined, the CPU 1301 performs the track processing in S124. Details of this track processing will be described later.

Furthermore, in S126, the CPU 1301 performs processing to record the still image data in the recording medium 128. This processing is substantially similar to the processing described in S114. However, in the case of the continuous photographing mode, newly obtained still image data is successively recorded in the previously recorded still image file.

In S128, the CPU 1301 additionally records data indicating the tracking position obtained as a result of the track processing of S124 in the still image file recorded in the recording medium 128 in S126.

In S130, the CPU 1301 determines whether the second release switch is turned off. When it is determined in S130 that the second release switch is not turned off, the CPU 1301 executes the processing of S120 and the subsequent processing. In the example of FIG. 5, the continuous photographing operation is continued until the second release switch is turned off.

When it is determined in S130 that the second release switch is turned off, the CPU 1301 in S132 controls the display element drive circuit 122 to set the tracking frame to non-display. Afterward, the CPU 1301 ends the operation shown in FIG. 5.

Figure 6:
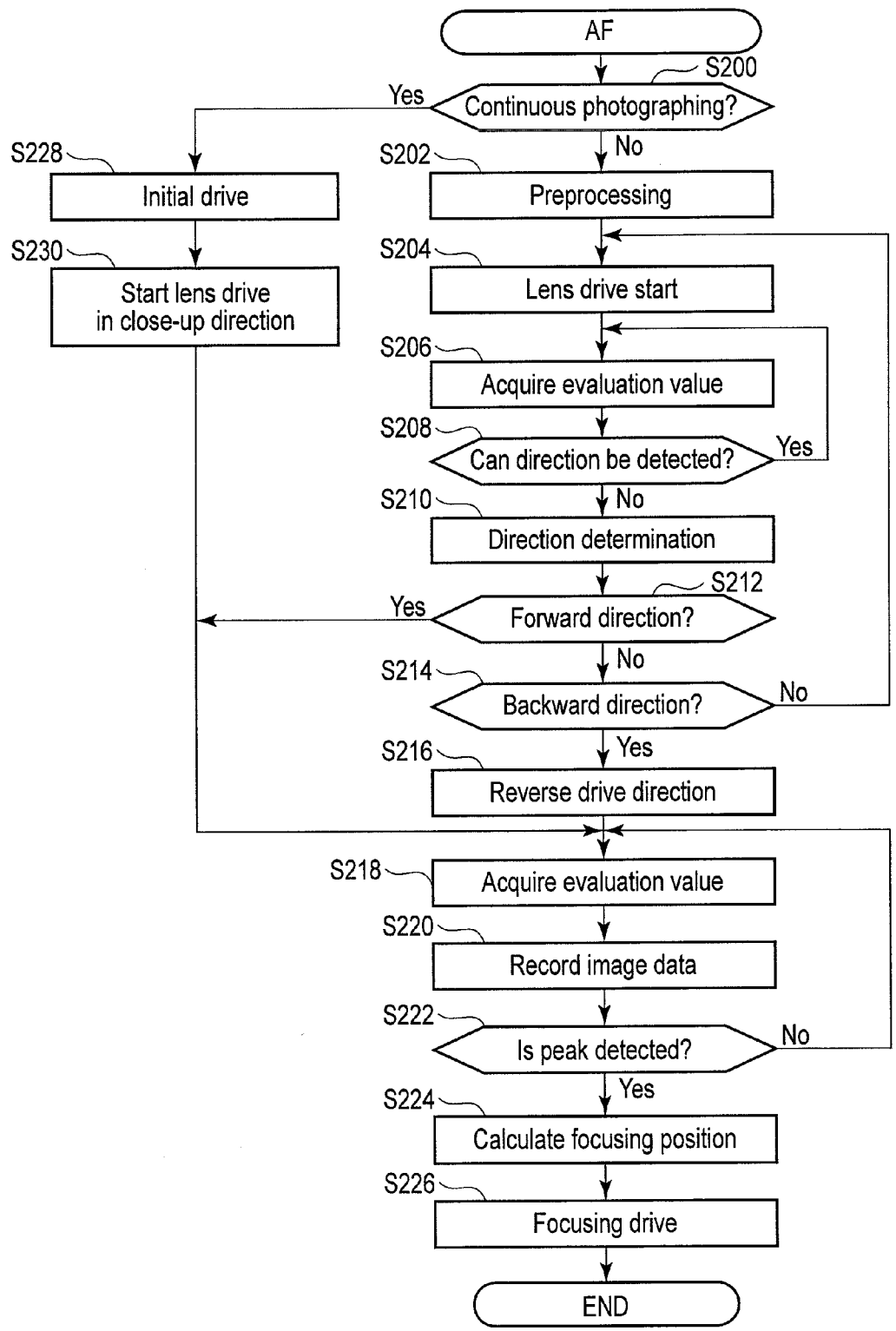
FIG. 6 is a flowchart showing AF processing.

Next, the AF processing will be described. FIG. 6 is a flowchart showing the AF processing. The processing of FIG. 6 is performed by cooperation of the CPU 1301, the AF control circuit 1302 and the focus detecting information acquiring circuit 1308.

In S200, the AF control circuit 1302 determines whether or not the photographing setting is the continuous photographing mode.

When it is determined in S200 that the photographing setting is not a continuous photographing mode, but is a usual mode, the AF control circuit 1302 performs preprocessing in S202. As the preprocessing, for example, the AF control circuit 1302 initializes the AF evaluation value held by the focus detecting information acquiring circuit 1308. Furthermore, as preprocessing, the AF control circuit 1302 controls the focus adjustment mechanism 104 to drive the focus lens in the photographing optical system 102 to a predetermined initial position.

In S204, the AF control circuit 1302 controls the focus adjustment mechanism 104 to start the drive of the focus lens in the photographing optical system 102.

In S206, the focus detecting information acquiring circuit 1308 extracts the high frequency components of the image data acquired by the imaging element 114, and accumulates the extracted high frequency components to acquire the AF evaluation value.

In S208, the AF control circuit 1302 determines whether or not a direction in which the focus lens is to be driven can be detected from the AF evaluation value acquired by the focus detecting information acquiring circuit 1308. When the AF evaluation value acquired in the present processing increases from the AF evaluation value acquired in the previous processing, it is detected that the direction in which the focus lens is to be driven is a forward direction. Furthermore, when the AF evaluation value acquired in the present processing decreases from the AF evaluation value acquired in the previous processing, it is detected that the direction in which the focus lens is to be driven is a backward direction. Therefore, it is determined in S208 whether or not a change amount of the AF evaluation value can be calculated. When the change amount of the AF evaluation value can be calculated, it is determined that it is possible to detect the direction in which the focus lens is to be driven.

When it is determined in S208 that it is possible to detect the direction in which the focus lens is to be driven, the AF control circuit 1302 in S210 determines the direction in which the focus lens is to be driven. Here, the direction in which the focus lens is to be driven is determined from a symbol of the change amount of the AF evaluation value.

In S212, the AF control circuit 1302 determines whether or not the direction in which the focus lens is to be driven is the forward direction. Here, when the symbol of the change amount of the AF evaluation value is positive, it is determined that the direction in which the focus lens is to be driven is the forward direction. In actuality, when the change amount of the AF evaluation value is smaller than a predetermined threshold value, there is a possibility that it cannot be considered that the direction in which the focus lens is to be driven is the forward direction, even if the symbol of the change amount of the AF evaluation value is positive. Therefore, even when the symbol of the change amount of the AF evaluation value is positive, it may be determined that the direction in which the focus lens is to be driven is not the forward direction in a case where an absolute value of the change amount is smaller than the predetermined threshold value.

In S212, when the AF control circuit 1302 determines that the direction in which the focus lens is to be driven is the forward direction, the CPU 1301 shifts the processing to S218.

When it is determined in S212 that the direction in which the focus lens is to be driven is not the forward direction, the AF control circuit 1302 in S214 determines whether or not the direction in which the focus lens is to be driven is the backward direction. Here, when the symbol of the change amount of the AF evaluation value is negative, it is determined that the direction in which the focus lens is to be driven is the backward direction. In actuality, when the change amount of the AF evaluation value is smaller than the predetermined threshold value, there is a possibility that it cannot be considered that the direction in which the focus lens is to be driven is the backward direction, even if the symbol of the change amount of the AF evaluation value is negative. Therefore, even when the symbol of the change amount of the AF evaluation value is negative, it may be determined that the direction in which the focus lens is to be driven is not the backward direction in a case where the absolute value of the change amount is smaller than the predetermined threshold value.

In S214, when the AF control circuit 1302 determines that the direction in which the focus lens is to be driven is not the backward direction, it is meant that the drive direction of the focus lens cannot be determined. At this time, the CPU 1301 returns the processing to S204. In this case, the drive direction is determined again.

In S214, when the AF control circuit 1302 determines that the direction in which the focus lens is to be driven is the backward direction, the AF control circuit 1302 in S216 controls the focus adjustment mechanism 104 to reverse the drive direction of the focus lens in the photographing optical system 102.

In S218, the focus detecting information acquiring circuit 1308 extracts the high frequency components of the image data acquired by the imaging element 114 and accumulates the extracted high frequency components to acquire the AF evaluation value.

In S220, the CPU 1301 stores the image data acquired via the imaging element 114 in the work area of the RAM 118. Every time the processing of S220 is performed, the image data is successively additionally stored. Here, when the image data is stored in S220, the image data to be stored is associated with the AF evaluation value.

In S222, the AF control circuit 1302 determines whether or not the maximum (peak) of the AF evaluation value is detected from the AF evaluation value acquired by the focus detecting information acquiring circuit 1308. The peak of the AF evaluation value is detected by detecting that the AF evaluation value turns from an increase tendency to a decrease tendency.

When it is determined in S222 that the peak of the AF evaluation value is not detected, the CPU 1301 returns the processing to S218. In this case, the next AF evaluation value is acquired to perform the peak detection again.

When it is determined in S222 that the peak of the AF evaluation value is detected, the AF control circuit 1302 in S224 calculates a position of the focus lens where the AF evaluation value reaches a real peak, as the focusing position, on the basis of the AF evaluation values in the vicinity of the detected peak.

In S226, the AF control circuit 1302 controls the focus adjustment mechanism 104 to drive the focus lens in the photographing optical system 102 to the focusing position. The AF processing ends in this manner.

When it is determined in S200 that the photographing setting is the continuous photographing mode, the AF control circuit 1302 in S228 controls the focus adjustment mechanism 104 to perform the initial drive of the focus lens. The initial drive is to drive the focus lens to the initial position. For example, in the processing, the focus lens is driven to a position shifted by as much as a predetermined amount from the previous focusing position toward an infinity side.

In S230, the AF control circuit 1302 controls the focus adjustment mechanism 104 to perform the scanning operation of driving the focus lens from the initial position toward a close-up side. Afterward, the CPU 1301 shifts the processing to S218. As described above, in the case of the continuous photographing mode, the drive direction of the focus lens is determined in one direction. In the case of the continuous photographing mode, it is presumed that the subject moves in the optical axis direction of the photographing lens, and the drive direction of the focus lens is beforehand set in accordance with the moving direction of the subject, to enhance AF following properties. Therefore, the processing of the detection of the drive direction as in the usual mode is not required.

Furthermore, during the calculation of the AF evaluation value in S218 of the continuous photographing mode, there is used the image data acquired by the imaging element 114 at a timing during the main exposure as the imaging operation for the still image photographing.

Figure 7:
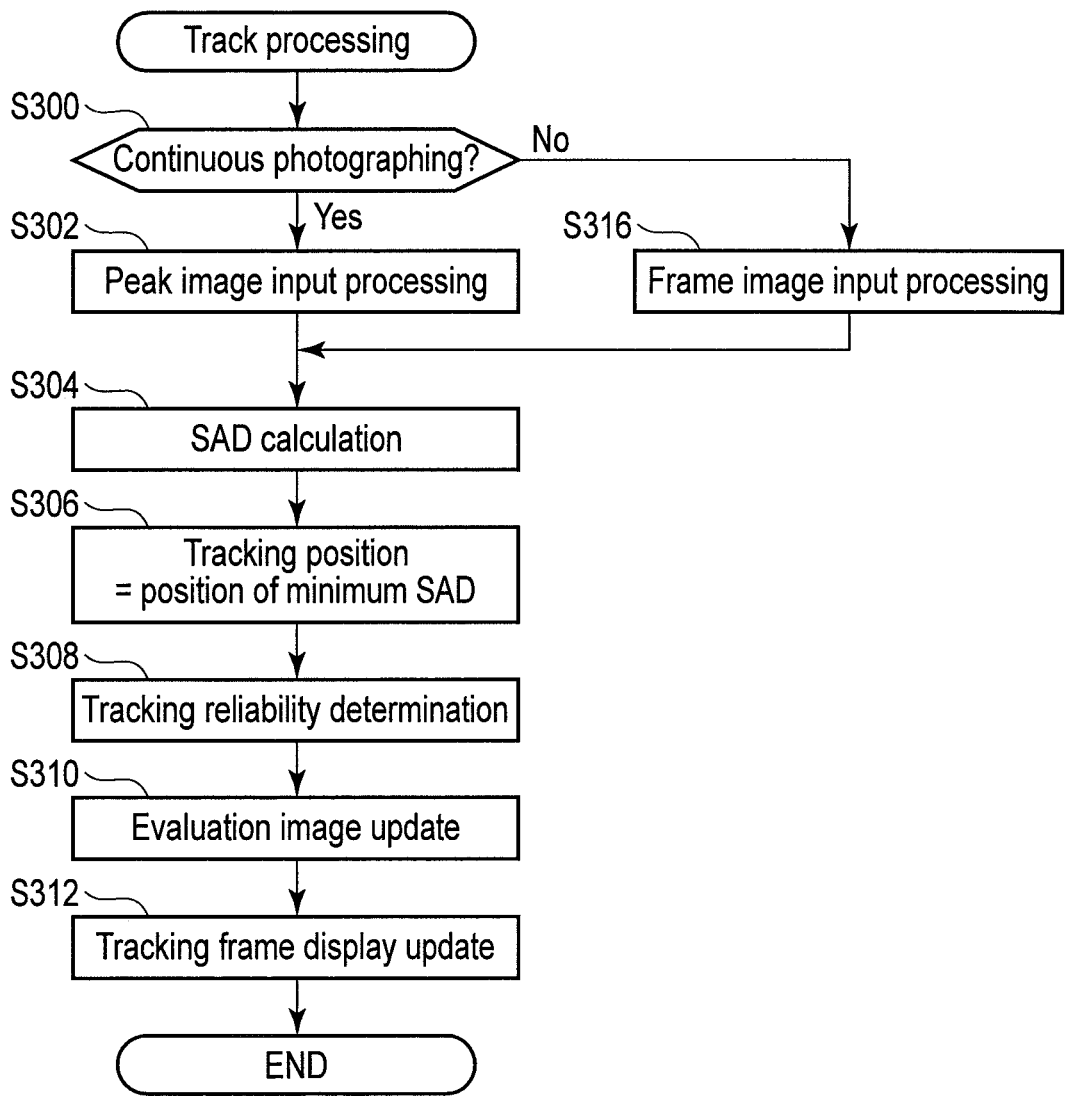
FIG. 7 is a flowchart showing the track processing in which the luminance information is used.

Next, the track processing in the present embodiment will be described. FIG. 7 is a flowchart showing the track processing in which the luminance information is used. The processing of FIG. 7 is performed mainly by the track processing circuit 1305. Here, in the track processing in which the luminance information is utilized, it is necessary to beforehand acquire the evaluation image data. The evaluation image data is acquired during the display of the tracking frame and recorded in the tracking image area as an image storage section. Furthermore, a size of the tracking area is preset by the track processing circuit 1305.

In S300, the track processing circuit 1305 determines whether or not the photographing setting is the continuous photographing mode.

When it is determined in S300 that the photographing setting is the continuous photographing mode, the track processing circuit 1305 in S302 acquires the peak image data stored in the RAM 118. The peak image data is image data in which the AF evaluation value is the maximum of the image data stored in the work area of the RAM 118.

When it is determined in S300 that the photographing setting is not the continuous photographing mode, but is the usual mode, the track processing circuit 1305 in S316 acquires the image data via the imaging element 114. At this time, the CPU 1301 controls the imaging element IF circuit 116 to execute the imaging by the imaging element 114. The track processing circuit 1305 takes the image data obtained in the imaging element IF circuit 116 into the RAM 118 by the imaging of the imaging element 114.

In S304, the track processing circuit 1305 calculates a sum of absolute differences (SAD) as a degree of image correlation between the reference image data and the evaluation image data. In the track processing in which the luminance information is used in the present embodiment, the SAD is calculated in accordance with Equation 1 in the following.

$$\sum_{j=0}^{N-1}\sum_{i=0}^{M-1} |I(i, j) - T(i, j)| \qquad \text{(Equation 1)}$$

where M indicates a size (the number of pixels) of the evaluation image data in a horizontal direction and N indicates a size (the number of the pixels) of the evaluation image data in a vertical direction. I(i, j) indicates pixel data of a coordinate (i, j) in the evaluation image data. Furthermore, T(i, j) indicates pixel data of the coordinate (i, j) in the reference image data.

In S306, the track processing circuit 1305 detects the coordinate (i, j) in the reference image data in which the SAD is smallest, and this coordinate (i, j) is acquired as the tracking position.

In S308, the track processing circuit 1305 determines a reliability of the tracking position. The reliability of the tracking position is determined, for example, from data of each pixel of the reference image data. Specifically, when a sum of differences between the adjacent pixels of the tracking area set to the reference image data is a predetermined value or less, it is determined that the tracking position has the reliability.

In S310, the track processing circuit 1305 updates the evaluation image data in accordance with the tracking position. The updated evaluation image data is the image data of the predetermined region including the tracking position determined in S306. However, when it is determined in S308 that the reliability is low, the evaluation image data does not need to be updated.

In S312, the track processing circuit 1305 controls the display element drive circuit 122 to update a display position of the tracking frame to a position corresponding to the tracking position determined in S306. Afterward, the track processing circuit 1305 ends the track processing of FIG. 7. However, when it is determined in S308 that the reliability is low, the display position of the tracking frame does not need to be updated.

Figure 8:
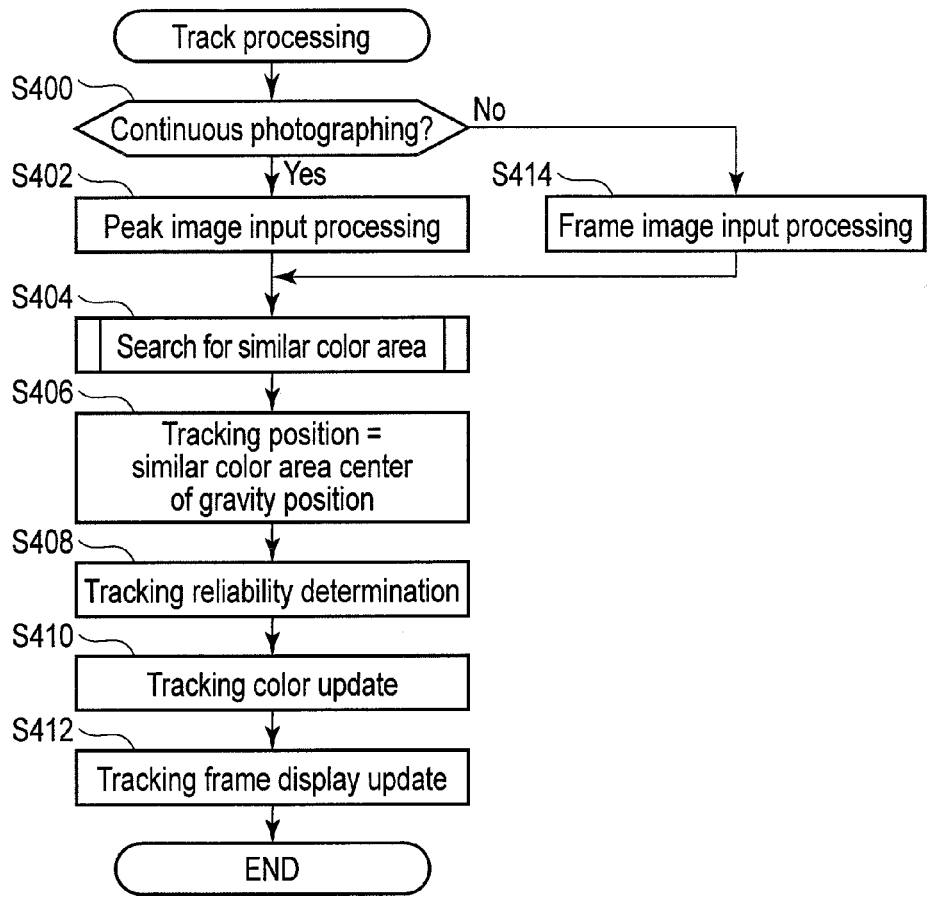
FIG. 8 is a flowchart showing the track processing in which the color information is used.

FIG. 8 is a flowchart showing the track processing in which the color information is utilized. The processing of FIG. 8 is performed mainly by the track processing circuit 1306. Here, similarly to the track processing in which the luminance information is utilized, it is necessary to beforehand store the evaluation image data in the tracking image area also in the track processing in which the color information is utilized. Furthermore, a size of the tracking area is preset by the track processing circuit 1306.

In S400, the track processing circuit 1306 determines whether or not the photographing setting is the continuous photographing mode.

When it is determined in S400 that the photographing setting is the continuous photographing mode, the track processing circuit 1306 in S402 acquires the peak image data stored in the RAM 118.

When it is judged in S400 that the photographing setting is not the continuous photographing mode, but is the usual mode, the track processing circuit 1306 acquires the image data via the imaging element 114 in S414.

In S404, from the reference image data, the track processing circuit 1306 searches for a position (coordinate) of the pixel having the color information of the most similarity, i.e., the highest degree of similarity to the color information of a tracking color. Then, as the similar color area, the track processing circuit 1306 searches for an area including the pixel of the most similar color and having color information similar to the pixel of the most similar color. Details of search processing of the similar color area will be described later. It is to be noted that during the first search, the color information acquired from the evaluation image data is the color information of the tracking color. During the next search or more, the color information updated in S410 is used. It is to be noted that there are no special restrictions on the color information, and the color information may be RGB data, SUV data or the like.

In S406, the track processing circuit 1306 determines that the center of gravity position of the similar color area is the tracking position.

In S408, the track processing circuit 1306 determines the reliability of the tracking position. The reliability of the tracking position is determined, for example, from a saturation of each pixel of the reference image data. Specifically, when the saturation of the tracking position of the reference image data is a predetermined value or more, it is determined that the tracking position has the reliability.

In S410, the track processing circuit 1306 updates tracking color information. The updated tracking color data is new color information of the tracking position. However, when it is determined in S408 that the reliability is low, the tracking color information does not need to be updated.

In S412, the track processing circuit 1306 controls the display element drive circuit 122 to update the display position of the tracking frame to a position corresponding to the tracking position determined in S406. Afterward, the track processing circuit 1306 ends the track processing of FIG. 8. However, when it is determined in S408 that the reliability is low, the display position of the tracking frame does not need to be updated.

Figure 9:
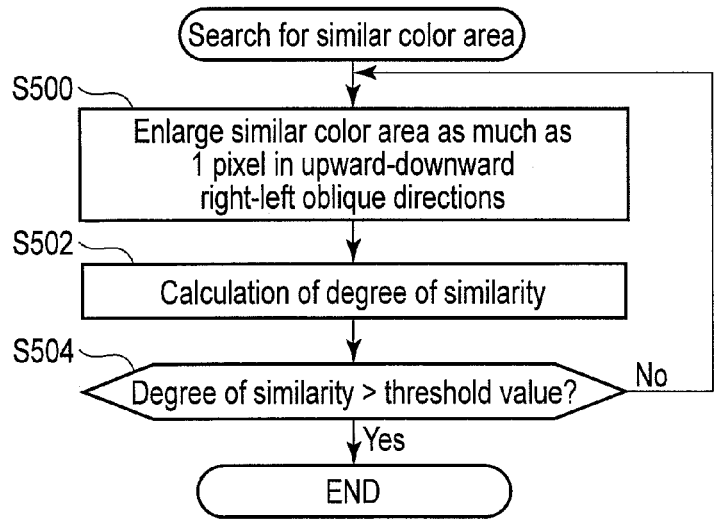
FIG. 9 is a flowchart showing search processing of a similar color area.

FIG. 9 is a flowchart showing the search processing of the similar color area. In S500, the track processing circuit 1306 enlarges the similar color area by as much as one pixel in upward-downward right-left oblique directions. First, the area is enlarged by as much as one pixel from the pixel having the most similar color in the upward-downward right-left oblique directions, and subsequently, the enlarged similar color area is further enlarged in the upward-downward right-left oblique directions.

In S502, the track processing circuit 1306 calculates a degree of similarity as a degree of image correlation between the color information of the pixel having the most similar color and the enlarged pixel color information. The degree of similarity is represented by Equation 2 in the following.

$$\sum_{j=0}^{N-1}\sum_{i=0}^{M-1} |I - T(i, j)| \quad \text{(Equation 2)}$$

where M indicates a size (the number of pixels) of the enlarged similar color area in a horizontal direction and N indicates a size (the number of the pixels) of the enlarged similar color area in a vertical direction. Furthermore, I indicates the color information of the tracking color. Furthermore, T(i, j) indicates the color information of the coordinate (i, j) in the reference image data.

In S504, the track processing circuit 1306 determines whether or not the degree of similarity calculated in S502 is in excess of a predetermined threshold value.

When the degree of similarity is not in excess of the threshold value in S504, it is indicated that the color information of the enlarged similar color area is similar to the most similar color. In this case, the track processing circuit 1306 returns the processing to S500 to further enlarge the similar color area.

When the degree of similarity is in excess of the threshold value in S504, it is indicated that the color information of the enlarged similar color area is not similar to the most similar color. In this case, the enlarged pixel is not included in the similar color area. In this case, the track processing circuit 1306 ends the processing of FIG. 9 to end the search for the similar color area.

FIG. 10 is a flowchart showing the track processing in which the face detection is utilized. The processing of FIG. 10 is performed mainly by the face detection circuit 1307. Here, in the track processing in which face information is utilized, the evaluation image data does not necessarily need to be acquired beforehand. However, a size of the tracking area is preset by the face detection circuit 1307.

In S600, the track processing circuit 1306 determines whether or not the photographing setting is the continuous photographing mode.

When it is determined in S600 that the photographing setting is the continuous photographing mode, the face detection circuit 1307 in S602 acquires the peak image data stored in the RAM 118.

When it is determined in S600 that the photographing setting is not the continuous photographing mode, but is the usual mode, the face detection circuit 1307 acquires the image data via the imaging element 114 in S612.

In S604, the face detection circuit 1307 performs the face detection to the reference image data and searches for the face detecting position from the reference image data. Details of the search processing of the face detecting position will be described later.

In S606, the face detection circuit 1307 determines that the face detecting position having a maximum size is the tracking position.

In S608, the face detection circuit 1307 determines the reliability of the tracking position. As to the reliability of the tracking position, for example, similarly to the track processing of the luminance information, it is determined that the tracking position has the reliability when a sum of differences between the adjacent pixels of the face detecting position in the reference image data is a predetermined value or less.

In S610, the face detection circuit 1307 controls the display element drive circuit 122 to update the display position of the tracking frame to a position corresponding to the tracking position determined in S606. Afterward, the face detection circuit 1307 ends the track processing of FIG. 10.

FIG. 11 is a flowchart showing the search processing of the face detecting position. In S700, the face detection circuit 1307 calculates a degree of similarity as a degree of image correlation between the reference image data and the face parts. The degree of similarity is, for example, the SAD between the pixel data of each pixel of the reference image data and the pixel data of each face part.

In S702, the face detection circuit 1307 determines whether or not the degree of similarity is smaller than a predetermined threshold value.

When the degree of similarity is smaller than the threshold value in S702, i.e., when the corresponding area is similar to the face part, the face detection circuit 1307 identifies the area as the face detecting position in S704. Furthermore, when the degree of similarity is the threshold value or more in S702, the face detection circuit 1307 determines that the area is not the face detecting position in S706. Afterward, the face detection circuit 1307 ends the processing of FIG. 11.

Figure 12:
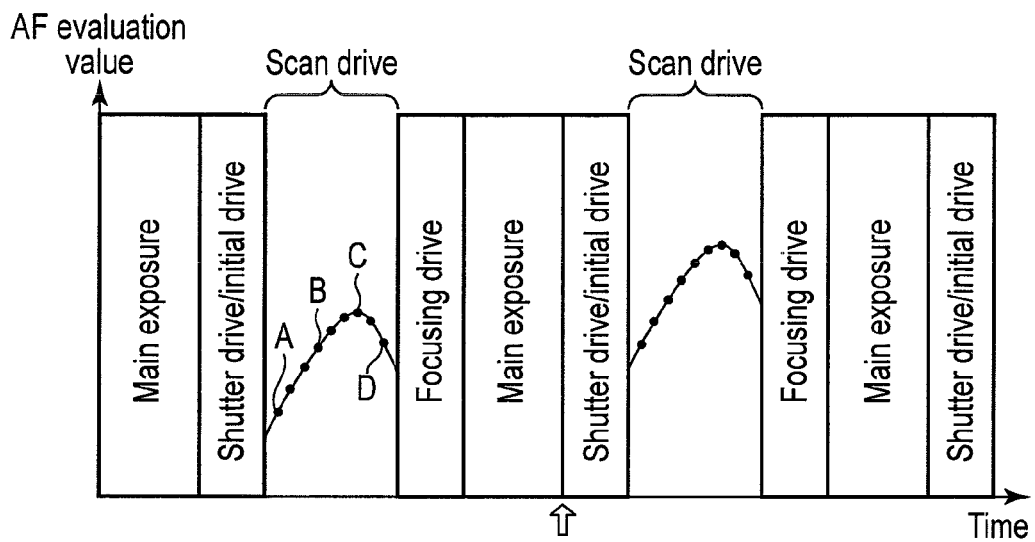
FIG. 12 is a diagram showing processing during a continuous photographing mode in time series.

FIG. 12 is a diagram showing processing during the continuous photographing mode in the present embodiment in time series. As described above, in the AF processing during the continuous photographing mode, the scanning operation is used. Initial drive is executed prior to the scanning operation, and the focus lens is positioned at an initial position where the AF evaluation value increases during the scanning operation. That is, to the focus lens position which is focused by the previous AF operation, the initial position is set by estimating the focus lens position where the AF evaluation value reaches the peak, in consideration of a presumed moving amount of the subject and a predetermined range of scanning drive.

Figure 13A:
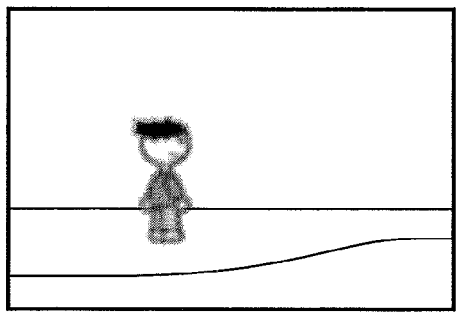
FIG. 13A is a view showing an example of image data obtained at a timing at a point A of FIG. 12.

Here, an example of an image obtained at a timing at a point A of FIG. 12 is shown in FIG. 13A. At the timing at the point A, the AF evaluation value is small and the focus lens noticeably shifts from the focusing position. Therefore, the image at the point A has a low contrast and blurred contour as shown in FIG. 13A.

Figure 13B:
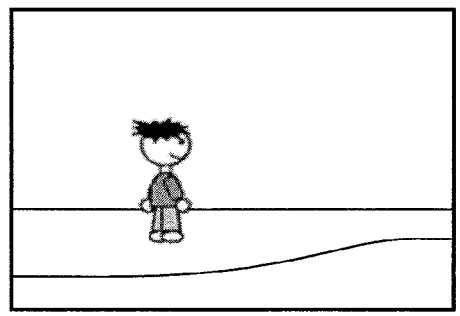
FIG. 13B is a view showing an example of image data obtained at a timing at a point B of FIG. 12.

An example of an image obtained at a timing at a point B of FIG. 12 is shown in FIG. 13B. At the timing at the point B, the AF evaluation value increases more than at the timing at the point A. This fact means that the focus lens comes close to the focusing position. Therefore, the contrast of the image at the point B improves as compared with the contrast of the image at the point A as shown in FIG. 13B. Here, although not shown in the drawing, a contrast of an image obtained at a timing at a point D of FIG. 12 is equal to a contrast of an image obtained at a timing at a point B. This is because the AF evaluation values are equal to each other.

Figure 13C:
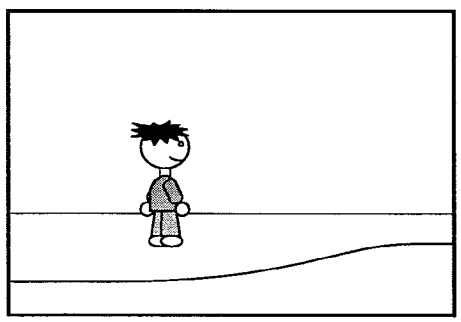
FIG. 13C is a view showing an example of image data obtained at a timing at a point C of FIG. 12.

An example of an image obtained at a timing at a point C of FIG. 12 is shown in FIG. 13C. The timing at the point C is a timing where a focus lens is at a focusing position. At this time, a contrast of the image is a maximum.

Here, when track processing is performed in a continuous photographing mode, image data obtained during a scanning operation between main exposures is used, so that a timing of the track processing can be close to a timing of the main exposure or focusing drive and following properties for a subject can be enhanced. However, when the image data during the scanning operation is selected at random, the lowering of a performance of the track processing is caused, depending on the selected image data.

In the present embodiment, the track processing is performed by using the peak image data in which the contrast is the maximum of the image data between the main exposures. Points E and F shown in FIG. 14 are timings when the peak image data can be obtained by the scanning operation between the respective main exposures. The peak image data is clear image data as shown in FIG. 15A and FIG. 15B. The track processing is performed by using such clear image data, so that the performance of the track processing can be enhanced.

Here, as another technique of performing the track processing by using the image data having a high contrast, use of the image data obtained during the main exposure is assumed. However, in this case, there is a possibility that the track processing is delayed during the photographing of a fast moving subject. This is because even in high speed continuous photographing of a continuous photographing speed of, for example, 10 frames/second, an interval between the main exposures is 100 ms and is large for an acquisition interval of tracking information, which is insufficient. In the present embodiment, there is used the peak image data which can be obtained at the timing close to the focusing drive in the main exposure or the AF processing prior to the main exposure, and has the high contrast, so that it is possible to enhance the following properties for the fast moving subject, while enhancing the performance of the track processing.

Hereinafter, modifications of the present embodiment will be described.

[Modification 1]

Figure 16:
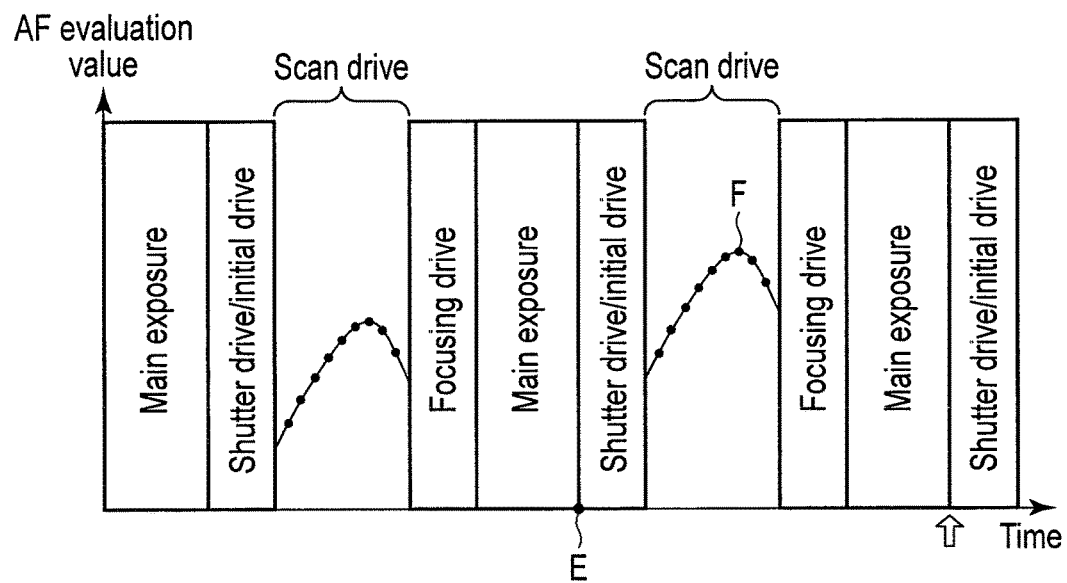
FIG. 16 is a diagram showing a modification in which main exposure image data and peak image data are used in track processing.
Figure 17A:
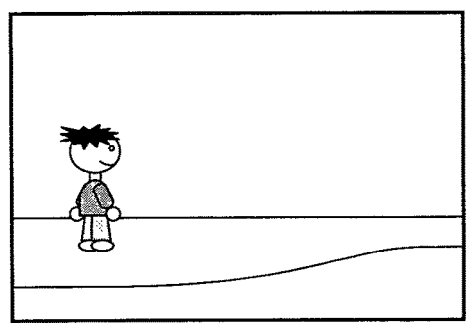
FIG. 17A is a view showing an example of the main exposure image data.
Figure 17B:
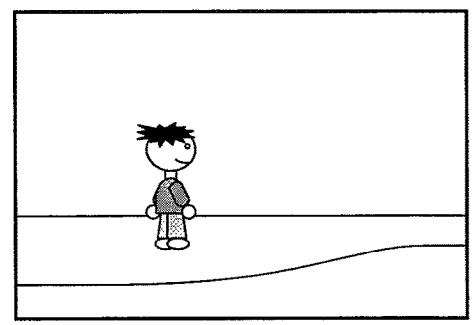
FIG. 17B is a view showing an example of the peak image data.

As to any one of track processing in which luminance information is used, track processing in which color information is used and track processing in which face detection is used, the track processing is performed by using image data of two frames. In the above-mentioned embodiment, any image data of the two frames for use in the track processing is the peak image data. On the contrary, the track processing may be performed by using the peak image data and image data obtained during the main exposure (hereinafter referred to as the main exposure image data). Specifically, the track processing of the next time is performed by using the main exposure image data obtained at a point E of FIG. 16 and the peak image data obtained at a point F of FIG. 16. The main exposure image data is clear image data as shown in FIG. 17A. Furthermore, the peak image data is also clear image data as shown in FIG. 17B. The track processing is performed by using such clear image data, thereby enabling enhancement of a performance of the track processing. Furthermore, a time difference between the image data of two frames is shortened, thereby enabling further enhancement of following properties for a fast moving subject.

[Modification 2]

When track processing is performed by using main exposure image data and peak image data, both pieces of the image data may be different in size or structure (format).

For example, to enhance following properties of AF processing during a continuous photographing operation, a speed of a scanning operation needs to be raised. In this case, it is necessary to drive a focus lens at a high speed, and additionally it is preferably possible to calculate an AF evaluation value at a high speed. In this case, as one technique of calculating the AF evaluation value at the high speed, it is presumable to reduce a size of the image data for use in calculating the AF evaluation value. The image data is reduced, so that a reading time of the image data can be shortened and a calculation load during the calculation of the AF evaluation value can also be alleviated. In consequence, it is also possible to avoid an increase of a circuit scale or a cost increase due to the high speed of the circuit.

One example of the reduction of the image data will be described. For example, when image data in which the number of pixels is 12,000,000 (an image size of 4000× 3000) is resized into image data corresponding to the VGA standard (an image size of 640×480), adding or thinning processing is performed so that the number of the pixels is about ⅙ in each of horizontal and vertical directions. Here, the pixel adding or thinning processing may be performed in the imaging element 114 or in a processing circuit (the imaging element IF circuit 116 or the like) outside the imaging element 114.

Figure 18A:
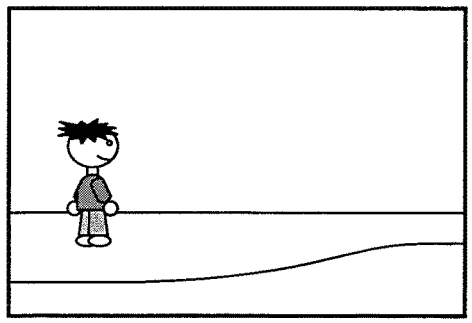
FIG. 18A and FIG. 18B are explanatory views of the track processing of a modification in which there is a size difference between the main exposure image data and the peak image data.
Figure 18B:
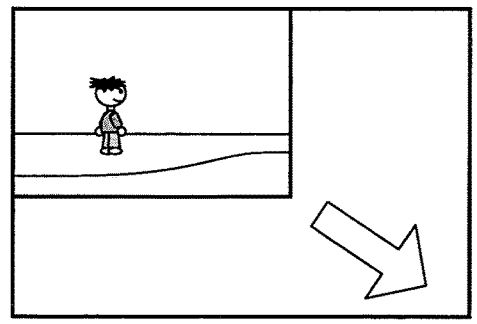

When the image data is reduced, a size difference is caused between the main exposure image data and the peak image data. FIG. 18A shows an example of the main exposure image data and FIG. 18B shows an example of the peak image data after the reduction. The track processing cannot be performed by using the image data having such a size difference. Therefore, during the track processing, the size difference between both pieces of the data is corrected. In this correction, for example, there is contrived a technique of enlarging the peak image data to the same size as that of the main exposure image data.

Furthermore, the AF evaluation value is calculated for the purpose of evaluating the contrast of the image data, and hence the value can be calculated from the image data in which only the luminance information is used. The image data in which only the luminance information is used is generated by adding (mixing) respective pieces of pixel data of RGB pixels at a predetermined ratio to convert the pixel data to luminance data and suitably arranging the prepared pieces of luminance data.

Figure 19A:
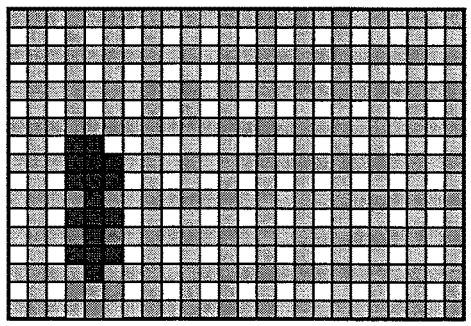
FIG. 19A and FIG. 19B are explanatory views of the track processing of a modification in which there is a structure difference between the main exposure image data and the peak image data.
Figure 19B:
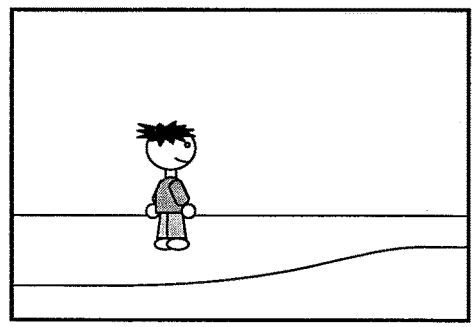

Here, when the image data for calculating the AF evaluation value comprises the only luminance data, each pixel only has the luminance information also in the peak image data. On the other hand, in the main exposure image data, for example, when a color filter arrangement of the imaging element 114 is the Bayer arrangement, each pixel has information of one color. FIG. 19A shows an example of the main exposure image data of the Bayer arrangement and FIG. 19B shows an example of the peak image data converted to the luminance information. The track processing cannot be performed even by using the image data having such a difference in structure. Therefore, the difference in structure between both of the data is corrected during the track processing. In this correction, for example, there is contrived a technique of converting the main exposure image data to the luminance information in the same manner as in the peak image data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
 a focus adjusting section which performs a scanning operation to execute imaging operations plural times by an imaging element while moving a focus lens included in a photographing optical system, and to detect a position of the focus lens in which there is image data acquired during a scanning operation, where a contrast reaches a peak, among pieces of image data acquired during a scanning operation by the imaging element and stored in RAM as results of the imaging operations of the plural times, and moves the focus lens to a focusing position calculated based on the position where the contrast reaches the peak;
a controller which allows the imaging element to execute a continuous still image photographing operation of repeatedly performing a main exposure imaging operation for generating main exposure image data and storing the main exposure image data in RAM and recording the main exposure image data on a recording medium; and
a track processing section which tracks a subject based on the image data acquired during a scanning operation and the main exposure image data acquired by the imaging element and stored in RAM and determines a tracking position in the image data,
wherein the track processing section allows the focus adjusting section to execute the scanning operation between (A) a first one of the main exposure imaging operations and (B) a subsequent one of the main exposure imaging operations during the execution of the continuous photographing operation to distinguish the image data acquired during a scanning operation in which the contrast reaches the peak,
wherein the track processing section tracks the subject based on both of the image data acquired during a scanning operation in which the contrast reaches the peak and the main exposure image data acquired in at least one of the first and subsequent ones of main exposure imaging operations, and determines a tracking position in the image data,
wherein the image data acquired in the scanning operation and the main exposure image data acquired in the main exposure imaging operations are different from each other in image data format, and the track processing section corrects a difference in image data format between the image data acquired in the scanning operation and the main exposure image data acquired in the still image photographing operation,
wherein the main exposure image data includes color information, and the image data acquired in the scanning operation includes only luminance data, and
wherein the track processing section corrects the difference in image data format between the image data acquired in the scanning operation and the main exposure image data acquired in the still image photographing operation by converting the main exposure image data to luminance data.

2. The image processing device according to claim 1, wherein the track processing section tracks the subject based on luminance information or color information included in the image data acquired during a scanning operation, as corrected, and in the main exposure image data, as corrected.

3. The image processing device according to claim 1, wherein the track processing section detects a face based on the image data acquired during a scanning operation, as corrected, and the main exposure image data, as corrected, and tracks the subject based on the detected face.

4. The image processing device according to claim 1, wherein the track processing section corrects the difference in constitution between the image data acquired during a scanning operation and the at least one of the first and subsequent ones of the main exposure image data by converting the pixel data to the luminance data.

5. An image processing device comprising:
a focus adjusting section which performs a scanning operation to execute imaging operations of plural times by an imaging element while moving a focus lens included in a photographing optical system, and to detect a position of the focus lens in which there is image data acquired during a scanning operation, where a contrast reaches a peak, among pieces of AF scan image data acquired by the imaging element and stored in RAM as results of the imaging operations of the plural times, and moves the focus lens to a focusing position calculated based on the position where the contrast reaches the peak;
a controller which allows the imaging element to execute a continuous still image photographing operation of repeatedly performing a main exposure imaging operation for generating main exposure image data and storing the main exposure image data in RAM and recording the main exposure image data on a recording medium; and
a track processing section which tracks a subject based on the image data acquired during a scanning operation and the main exposure image data acquired by the imaging element and stored in RAM and determines a tracking position in the image data,
wherein the track processing section allows the focus adjusting section to execute the scanning operation between (A) a first one of the main exposure imaging operations, and (B) a subsequent one of the main exposure imaging operations during the execution of the continuous still image photographing operation, and tracks the subject based on the image data, where the contrast has a predetermined value or more, of the image data acquired during the scanning operation and determines a tracking position in the image data,
wherein the track processing section tracks the subject based on both of the image data acquired during a scanning operation data where the contrast has a predetermined value or more and the main exposure image data acquired in at least one of the first and subsequent ones of the main exposure imaging operations,
wherein the image data acquired in the scanning operation and the main exposure image data acquired in the main exposure imaging operations are different from each other in image data format, and the track processing section corrects a difference in image data format between the image data acquired in the scanning operation and the main exposure image data acquired in the still image photographing operation,
wherein the main exposure image data includes color information, and the image data acquired in the scanning operation includes only luminance data, and
wherein the track processing section corrects the difference in image data format between the image data acquired in the scanning operation and the main exposure image data acquired in the still image photographing operation by converting the main exposure image data to luminance data.

6. The image processing device according to claim 5, wherein the track processing section tracks the subject based on luminance information or color information included in the image data acquired during a scanning operation, as corrected, and in the main exposure image data, as corrected.

7. The image processing device according to claim 5, wherein the track processing section detects a face on the basis of the image data acquired during a scanning operation, as corrected, and the main exposure image data, as corrected, and tracks the subject based on the detected face.

8. The image processing device according to claim 5, wherein the track processing section corrects the difference in size between the image data acquired during a scanning operation and the main exposure image data by resizing the image data.

9. The image processing device according to claim 5, wherein the track processing section corrects the difference in constitution between the image data acquired during a scanning operation and the main exposure image data by converting the pixel data to the luminance data.

10. An image processing method using an image element for capturing a subject image, acquiring image data on the subject, and storing the image data in RAM, the image processing method comprising:

causing the imaging element to execute, automatically, a continuous still image photographing operation of repeatedly performing a main exposure imaging operation for generating main exposure image data and storing the main exposure image data in RAM and recording the main exposure image data on a recording medium;

executing, automatically using an autofocus control circuit, imaging operations plural times by the imaging element while automatically moving a focus lens included in a photographing optical system between (A) a first one of the main exposure imaging operations and (B) a subsequent one of the main exposure imaging operations during the continuous still image photographing operation; and tracking, automatically using a track processing circuit, a subject based on the image data acquired during a scanning operation where a contrast reaches a peak, among pieces of image data acquired by the imaging element as results of the scanning operations, and the main exposure image data generated by the at least one of the first and subsequent main exposure imaging operations, and determining a tracking position in the image data, wherein the image data acquired in the scanning operation and the main exposure image data acquired in the main exposure imaging operations are different from each other in image data format, and the track processing section corrects a difference in image data format between the image data acquired in the scanning operation and the main exposure image data acquired in the still image photographing operation, wherein the main exposure image data includes color information, and the image data acquired in the scanning operation includes only luminance data, and wherein the tracking corrects the difference in image data format between the image data acquired in the scanning operation and the main exposure image data acquired in the still image photographing operation by converting the main exposure image data to luminance data.

11. The image processing method according to claim 10, wherein the tracking is performed based on luminance information or color information included in the image data acquired during a scanning operation, as corrected, and the main exposure image data, as corrected.

12. The image processing method according to claim 10, further comprising detecting a face based on the image data acquired during a scanning operation, as corrected, and the main exposure image data, as corrected, wherein the tracking is performed based on the detected face.

13. The image processing method according to claim 10, wherein the tracking corrects the difference in size between the image data acquired during a scanning operation and the main exposure image data acquired in the at least one of the first and subsequent main imaging operations by resizing the image data.

14. The image processing method according to claim 10, wherein the tracking is performed after correcting the difference in constitution between the image data acquired during a scanning operation and the main exposure image data acquired in the at least one of the first and subsequent main imaging operations by converting the pixel data to the luminance data.

15. An image processing method using an image element for capturing a subject image, acquiring image data on the subject, and storing the image data in RAM, the image processing method comprising:

causing the imaging element to execute, automatically, a continuous still image photographing operation of repeatedly performing a main exposure imaging operation for generating main exposure image data and storing the main exposure image data in RAM and recording the main exposure image data on a recording medium;

executing, automatically using an autofocus control circuit, imaging operations plural times by the imaging element while automatically moving a focus lens included in a photographing optical system between (A) a first one of the main exposure imaging operations and (B) a subsequent one of the main exposure imaging operations during the continuous still image photographing operation; and tracking, automatically using image data acquired during a scanning operation scan image data, where the contrast has a predetermined value or more, of the image data acquired by the imaging element as results of the scan operations, and the main exposure image data generated by the at least one of the first and subsequent main exposure imaging operations and determining a tracking position in the image data, wherein the image data acquired in the scanning operation and the main exposure image data acquired in the main exposure imaging operations are different from each other in image data format, and the track processing section corrects a difference in image data format between the image data acquired in the scanning operation and the main exposure image data acquired in the still image photographing operation, wherein the main exposure image data includes color information, and the image data acquired in the scanning operation includes only luminance data, and wherein the tracking corrects the difference in image data format between the image data acquired in the scanning operation and the main exposure image data acquired in the still image photographing operation by converting the main exposure image data to luminance data.

16. The image processing method according to claim 15, wherein the tracking is performed based on luminance information or color information included in the image data acquired during a scanning operation, as corrected, and the main exposure image data, as corrected.

17. The image processing method according to claim 15, further comprising detecting a face based on the image data acquired during a scanning operation, as corrected, and the main exposure image data, as corrected, wherein the tracking is performed based on the detected face.

18. The image processing method according to claim 15, wherein the tracking corrects the difference in size between the image data acquired during a scanning operation and the main exposure image data acquired in the at least one of the first and subsequent main imaging operations by resizing the image data.

19. The image processing method according to claim 15, wherein the tracking is performed after correcting the difference in constitution between the image data acquired during a scanning operation and the main exposure image data acquired in the at least one of the first and subsequent main imaging operations by converting the pixel data to the luminance data.

20. The image processing device according to claim 1, wherein a time period corresponding to the scanning operation does not overlap temporally with time periods corresponding to the first and subsequent ones of the main exposure operations.

21. The image processing device according to claim 5, wherein a time period corresponding to the scanning operation does not overlap temporally with time periods corresponding to the first and subsequent ones of the main exposure operations.

22. The image processing method according to claim 10, wherein a time period corresponding to the scanning operation does not overlap temporally with time periods corresponding to the first and subsequent ones of the main exposure operations.

23. The image processing method according to claim 15, wherein a time period corresponding to the scanning operation does not overlap temporally with time periods corresponding to the first and subsequent ones of the main exposure operations.

24. The image processing device according to claim 1, wherein the main exposure image data is of a larger size format than that of the image data acquired in the scanning operation, and
wherein the track processing section further corrects the difference in image data format between the image data acquired in the scanning operation and the main exposure image data acquired in the still image photographing operation by resizing at least one of (A) the main exposure image data and (B) the image data acquired in the scanning operation.

* * * * *